(12) United States Patent
Peterson

(10) Patent No.: US 10,679,277 B2
(45) Date of Patent: Jun. 9, 2020

(54) TRY-THRU

(71) Applicant: Susan L. Peterson, St. Charles, IL (US)

(72) Inventor: Susan L. Peterson, St. Charles, IL (US)

( * ) Notice: Subject to any disclaimer, the term of this patent is extended or adjusted under 35 U.S.C. 154(b) by 308 days.

(21) Appl. No.: 15/945,110

(22) Filed: Apr. 4, 2018

(65) Prior Publication Data

US 2018/0285962 A1 Oct. 4, 2018

Related U.S. Application Data

(63) Continuation-in-part of application No. 15/215,249, filed on Jul. 20, 2016.

(60) Provisional application No. 62/481,216, filed on Apr. 4, 2017.

(51) Int. Cl.
| | |
|---|---|
| *G06Q 30/06* | (2012.01) |
| *E04H 3/02* | (2006.01) |
| *G06Q 20/20* | (2012.01) |
| *G07G 1/00* | (2006.01) |
| *E04H 1/12* | (2006.01) |

(52) U.S. Cl.
CPC .......... *G06Q 30/0635* (2013.01); *E04H 3/02* (2013.01); *G06Q 20/202* (2013.01); *G06Q 20/209* (2013.01); *G07G 1/0036* (2013.01); *E04H 1/1233* (2013.01)

(58) Field of Classification Search
CPC ................................................ G06G 30/06–08
USPC ................................................ 705/26.1–27.2
See application file for complete search history.

(56) References Cited

U.S. PATENT DOCUMENTS

| | | | |
|---|---|---|---|
| 2003/0200148 A1* | 10/2003 | Razumov ........... | G06Q 10/0637 705/7.36 |
| 2006/0076397 A1* | 4/2006 | Langos ............... | G06Q 10/087 235/375 |
| 2009/0255195 A1* | 10/2009 | Bridgman ............ | E04H 14/00 52/174 |
| 2011/0161136 A1* | 6/2011 | Faith .................. | G06Q 30/0201 705/7.29 |
| 2013/0080289 A1* | 3/2013 | Roy .................... | G06Q 10/10 705/26.8 |
| 2014/0358742 A1* | 12/2014 | Achan ................ | G06Q 40/12 705/30 |
| 2015/0120514 A1* | 4/2015 | Deshpande ....... | G06Q 10/08355 705/28 |
| 2016/0092961 A1* | 3/2016 | Gopalsamy ....... | G06Q 30/0631 705/26.7 |

OTHER PUBLICATIONS

How to use an airline e-ticket, https://www.youtube.com/watch?v=BWX9NDnYwLc Aug. 24, 2010 (Year: 2010).*

* cited by examiner

*Primary Examiner* — Ming Shui
(74) *Attorney, Agent, or Firm* — Charles F. Meroni, Jr.; Meroni & Meroni, PC

(57) ABSTRACT

An improved drive through and foods store and associated systems and methods are provided. The present invention makes several improvements to the food industry by implementing novel methods to streamline the sale of organic foods to customers, thereby increasing velocity for such stores including novel supplying, ordering, and distribution models for organic and non-GMO foods.

12 Claims, 4 Drawing Sheets

200

Try-Thru™

THE MODERN WAY TO SHOP

COUPON

Thank you for your
recent Try-Thru visit.
Please enjoy 10% off
your next in store purchase.

Valid 4/1/18-4/7/18

300

Try-Thru™

THE MODERN WAY TO SHOP

SURVEY

Gender:
Male ☐  Female ☐

Age:
20-25 ☐   25-35 ☐
35-45 ☐   45-up ☐

How many times per month do you shop here?

1x per month ☐   2x per month ☐
3x per month ☐   4x or more ☐
                  per month How much do you spend per trip here?

☐         ☐         ☐         ☐
under $50  $50-$75   $75-$100  $100-up

*FIG. 5*

TRY-THRU

This application claims the benefit of application No. 62/481,216 filed 4 Apr. 2017.

BACKGROUND OF THE INVENTION

Field of the Invention

The present invention generally relates to an improved drive aka Try-Thru. In particular the present invention makes several improvements to the food industry by implementing novel methods to streamline the sale of foods to customers and for the collection of data on consumers and providing information to consumers. Typically, organic food stores utilize a buffet-style distribution and sale model, the system and design of the current invention allows users to short-circuit that process and receive similar food from a fast-food style drive through, while also providing data to both stores and users to improve sale velocity.

Discussion of the Prior Art

U.S. Pat. No. 6,435,406 ('406 Patent), which issued to Pentel, discloses a Remote Ordering Device. The '406 Patent describes a cell phone or other wireless telecommunications device is used to communicate with an ordering station over a cellular telephone communications network and telephone line. A coded item number can be entered and transmitted to the ordering station, which decodes the coded item number and enters the order into the point of sale system by a communications link. Further, data such as the identity of the user by physical characteristics, personal identification numbers, credit card or charge information, and location of the sender of the data can also be obtained from the wireless communications device and transmitted to the order station. In this manner remote ordering of goods or services can be communicated and transactions completed without having to be present at the sales point.

U.S. Pat. No. 7,895,797 ('797 Patent), which issued to Bridgman et al., describes a Drive-Thru System and Method. The '797 Patent describes a vehicular drive-thru food ordering and delivering system and method. The system includes a lot, a drive-thru lane and a building for receiving and filling drive-thru orders. The building has a primary food delivery window for passing ready orders to drive-thru customers, and a downstream in-line parking area for drive-thru vehicles having a delayed order. Proximate to and downstream from the primary food delivery window is a doorway for attendant access from the primary food delivery window to the downstream in-line parking area. An attendant runway is proximate and downstream of the doorway and proximate to the in-line vehicle waiting area. A customer with a delayed order can be directed to wait in the downstream in-line waiting area. When the delayed order is ready for delivery, an attendant can deliver the ready order via the proximate doorway and proximate attendant runway to a vehicle waiting in the in-line vehicle waiting area.

U.S. Pat. No. 7,992,355 ('355 Patent), which issued to Bridgman et al., describes a Drive-Thru System and Method. The '33 Patent describes a vehicular drive-thru food ordering and delivering system and method. The system includes a lot, a drive-thru lane and a building for receiving and filling drive-thru orders. The building has a primary food delivery window for passing ready orders to drive-thru customers, and a downstream in-line parking area for drive-thru vehicles having a delayed order. Proximate to and downstream from the primary food delivery window is a doorway for attendant access from the primary food delivery window to the downstream in-line parking area. An attendant runway is proximate and downstream of the doorway and proximate to the in-line vehicle waiting area. A customer with a delayed order can be directed to wait in the downstream in-line waiting area. When the delayed order is ready for delivery, an attendant can deliver the ready order via the proximate doorway and proximate attendant runway to a vehicle waiting in the in-line vehicle waiting area.

United States Patent Application, Publication No. 2004/0143503, which was authored by Suthar, describes a restaurant automation system with greater efficiencies for the restaurant owner and greater ease for the diner through the use of wireless electronic menus with which the individual diner can communicate an order to the central server which communicates to a kitchen display, and receives a message when order preparation has begun; the central server being also in communication with a payment station, which generates a bill at the direction of the diner.

SUMMARY OF THE INVENTION

A difficulty for grocery stores is simple distribution of their products to the consumer. There is therefore a need for a receipt computer application (app) that is a way for consumers to find the products they like inside the store very efficiently. Thus, the app of the current disclosure will tell consumers what aisles to find the products they purchased from the Try-Thru (Drive Thru in front of a grocery store). The app will texted/emailed a receipt (or if desired display the information within the app) to the consumer showing a purchased food from the Try-Thru. Indeed all the purchasing can be ordered through a computer application via their mobile phone if desired. This makes grocery store shopping more time efficient for consumers.

In short, the system includes a mobile application, a networking site, and a software program that simulate receipts. This is beneficial for consumers and retailers because it is all three things in one. The receipt on a mobile application, software program, and networking site of the try-Thru provides more convenience for retailers and consumers. It is a more cost effective form of advertising for retailers than through the mediums of radio, TV, and print.

In addition the efficiency allowed by capturing customers information (phone number or email address) through a computer application and where to find the items on the application will bring more consumers back to brick and mortar stores while modernizing the grocery store shopping experience. The app also can constitute form of direct modern of marketing for retailers. This allows retailers to directly market certain products inside the retailers. This is in a retail stores best interest because it is more cost efficient to advertise via through text messages/emails than thru radio, print, and TV. Modern consumers spend more time on their phone than in front of radio, TV, or newspaper. This gives the retailers a higher rate of capturing a consumers' attention making it a more efficient form of advertising.

In addition the computer application of the will also help the retailer tally what are the popular items to stock inside the grocery store or at a drive through (Try-Thru). This creates a velocity for the retailer and will save the retailer time and money by suggesting items to stock inside the store with actual data from its own consumers. Thus the application is a win: win scenario for retailers and our modern consumers. First it helps retailers sell and market products inside the store cost efficiently and second gives a nice velocity for the retailer as to what to efficiently stock their grocery store shelves with. In addition it saves modern consumers time to find the products they like inside the store by displaying aisle information and other related information. Thus can bring modern consumers back to brick and mortar locations thus creating more jobs and revenue as a whole throughout our economy.

In some situations the system can utilizes a second building or kiosk located in front of a grocery store that serves as a fast-serve drive through restaurant. The mobile application simplifies ordering and allows for "take out" ordering and in addition aids consumers in their purchasing decisions. The system also allows for the resupplying of the drive through from the organic and non-GMO foods store to reduce kitchen space and allow for a quicker and more efficient system for the store and store-ecosystem as a whole.

To achieve these objectives, a Try-Thru having the following features is proposed.

In a first embodiment the present disclosure contemplates a method for providing and selling food including, providing an food retail store; providing a drive through restaurant adjacent said food retail store; receiving orders from a customer; assembling a customer's food order based on the orders from the customer; checking out the customer; providing the customer's food order to the customer; and generating a receipt for the order on an associated application.

Another embodiment of the present disclosure contemplates a drive through restaurant system for providing both vehicular drive-thru and non-drive-thru customer food ordering including a parking lot; a first building situated on the lot, being a drive through restaurant for preparing drive-thru and non-drive-thru customer orders and for delivering of the customer orders to the customers; a second building situated on the lot, being a grocery store; a vehicular pathway for customers, the pathway including at least one lane for customer navigation; at least one order station located along the pathway for placing orders by customers in vehicles; the first building having a delivery window for delivering orders to a customer in a vehicle, the delivery window located adjacent to the pathway; and the grocery store supplying the restaurant with food preparations for sale.

Another embodiment of the present disclosure contemplates a method of servicing customers in vehicles in a vehicular drive-through to deliver ready orders to customers including providing a retail store; providing a drive through restaurant adjacent said retail store; communicating and receiving electronic communications between the retail store and the drive through restaurant; receiving orders from a customer; preparing ready orders based on the orders from the customer; checking out the customer; and delivering ready orders to the customer.

Such embodiments do not represent the full scope of the invention. Reference is made therefore to the claims herein for interpreting the full scope of the invention. Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief descriptions of drawings:

FIG. 5 is a representative survey for the Try Thru and displayed in associated applications.

DETAILED DESCRIPTION OF THE PREFERRED EMBODIMENT

Referring now the drawings with more specificity, the present invention essentially provides an foods or non-GMO foods drive through, application, coupons, an database and/or methods and systems for supplying a standalone fast food service from a big box retail store and associated applications for use with smart phones and other electronic devices. Using the present invention a user may be able to order food from a menu at a drive through or use associated applications to order take out that is equivalent to food provided at an organic food grocery store. In addition the system can be able to account for and work with several other variables and features discussed below.

Figure 1:
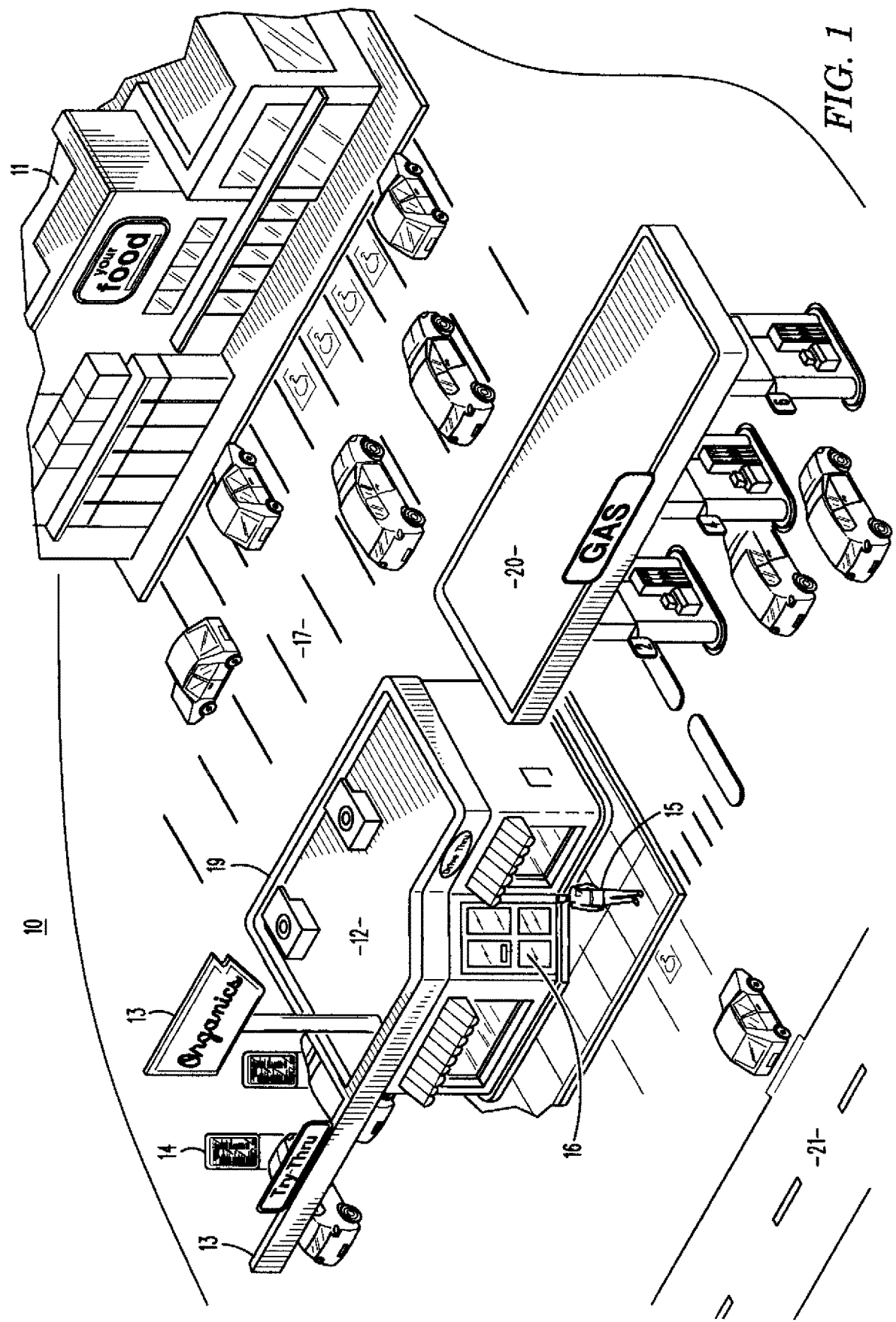
FIG. 1 is a perspective view of a representative Try Thru and food store parking lot.

Looking now to FIG. 1 a representative food system 10 is shown. As shown, organic food store 11, organic food drive through 12, and gas station 20 are situated on parking lot 17 adjacent to road 21. In certain embodiments banner or eve 13 may be situated such that customers 15 may easily pass under them and said eves 13 may provide advertising space or alternatively shading for customers from sun, rain, and the elements. Preferably customers 15 can order at a menu 14. Then customers can proceed to pick up window 19 (partially obscured) to pick up their order as in a traditional drive through.

Figure 2:
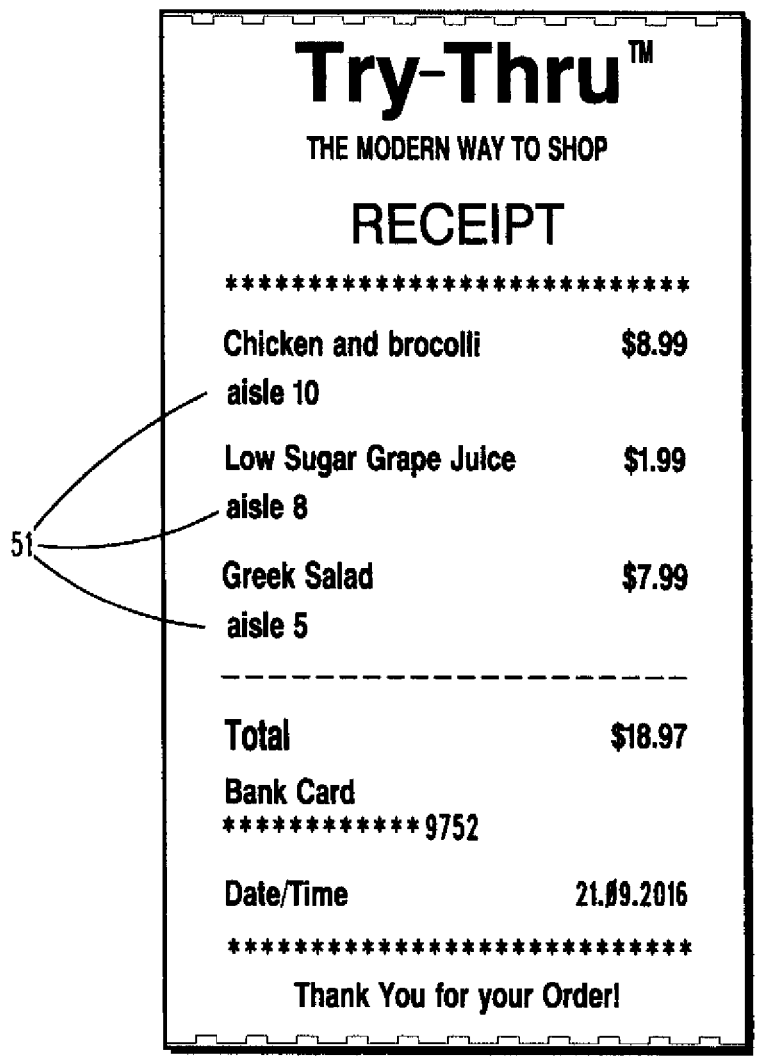
FIG. 2 is a representative receipt produced at the Try Thru and displayed in associated applications.

An alternative ordering and pick up system is also partially depicted in FIG. 1. Customer 15 may selectively order using a smart phone or internet application and enter into the fast organic food restaurant 12 by pick up entrance 16. This may also allow for the simultaneous pick up of groceries from store 11 if the option for grocery and organic food pickup is combined. An aspect of the preferred embodiment of the applications of the invention are shown in FIG. 2 which depicts a typical receipt 50 showing how one may pick up groceries in tandem. One unique feature of this system and receipt 50 is aisle marker 51.

Figures 3, 4:
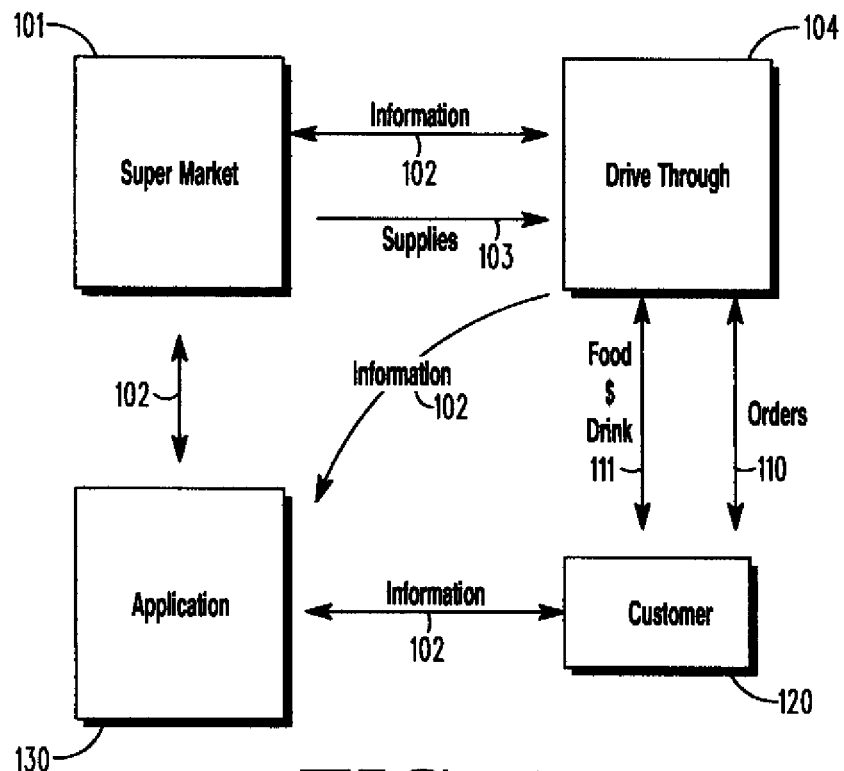
FIG. 3 is a representative flow chart describing methods associated with the Try Thru.
FIG. 4 is a representative coupon for the Try Thru and displayed in associated applications.

Looking now with greater specificity to FIG. 3 exemplary actions, methods, and transactions the operation of the proposed organics food drive through of the current invention are depicted. As shown in FIG. 3, supermarket 101 and drive through (thru) 104 share information 102. The market 101 supplies food and other supplies 103 to the drive through 104. The customers 120 can interact with the drive through 104 traditionally making orders 110, and getting food and drink 111 from the drive through in a traditional fashion. However, the drive through 104 can also send availability information to application 130, and customers 120 can then preview what is available at the drive through 104, and preorder. In addition, the store can do the same, so customers 120 can view the application 130 and see where in a store items are located (e.g. Aisle 5, Aisle 6, not in stock, etc). This will increase the customer's ability to quickly find what he/she is looking for, and inform them if it is available at the drive through. This increases the velocity at stores and promotes efficiency.

FIG. 4 depicts another portion of the present invention that improves the velocity of supermarkets, which is coupon 200. This is preferably available through the app 130. In conjunction with FIG. 5 showing survey 300 these application features can help initially calibrate the system (better coupons 200 can be offered for completing survey 300). This will both attract customers and initially calibrate the system. The system and application 130 can then self-adjust by observing the purchasing habits of users and tailoring ads and coupons to their self interest. Individual stores 101 can also use the app's ordering system to set up grocery "pick up" services, and even delivery (if desired). However, a goal of the system is that by providing aisle information (as at 51) to users via the app they will be encouraged to enter stores 11 and purchase desired and additional items.

Accordingly, although the invention has been described by reference to certain preferred and alternative embodiments, it is not intended that the novel arrangements be limited thereby, but that modifications thereof are intended to be included as falling within the broad scope and spirit of the foregoing disclosures and the appended drawings.

I claim:

1. A method for providing and selling food comprising:
providing a food retail store;
providing a drive through restaurant adjacent said food retail store;
receiving orders from a customer;
assembling a customer's food order at the drive through restaurant based on the orders from the customer;
checking out the customer;
providing the customer's food order to the customer; and
generating a receipt for the order on an associated application;
printing aisle information of the food order for the customer on the receipt.

2. The method of claim 1 further comprising: allowing reordering of food from the receipt.

3. The method of claim 1 wherein:
receiving orders from a customer comprises receiving orders from an internet application; and
providing the customer's food order to the customer is done at a pick up-only entrance.

4. A drive through restaurant system for providing both vehicular drive-thru and non-drive-thru customer food ordering comprising:
a parking lot;
a first building situated on the lot, being a drive through restaurant for preparing drive-thru and non-drive-thru customer orders and for delivering of the customer orders to the customers;
a second building situated on the lot, being a grocery store;
a vehicular pathway for customers, the pathway including at least one lane for customer navigation;
at least one order station located along the pathway for placing orders for the drive through restaurant by customers in vehicles;
the first building having a delivery window for delivering orders to a customer in a vehicle, the delivery window located adjacent to the pathway; and
the grocery store supplying the restaurant with food preparations for sale;
a user application configured to display order information and receipts, wherein the receipt includes data on the aisle locations of food in the second building.

5. The system of claim 4 wherein: the application displays a receipt following a purchase.

6. The system of claim 4 wherein: the user application displays information on what is available in the first building and the second building.

7. The system of claim 6 wherein:
the application also displays the location adjacent the available foods.

8. The system of claim 7 wherein:
the application can display redeemable coupons for use at either the first building or second building.

9. The system of claim 8 wherein:
said coupons are user-specific and respond to user purchasing patterns.

10. A method of servicing customers in vehicles in a vehicular drive-through to deliver ready orders to customers comprising:
providing a retail store;
providing a drive through restaurant adjacent said retail store;
communicating and receiving electronic communications between the retail store and the drive through restaurant;
receiving orders from a customer;
preparing at the drive through restaurant ready orders based on the orders from the customer;
checking out the customer; and
delivering ready orders to the customer;
generating a receipt for the order on an associated application;
printing aisle information of purchased items for the customer on the receipt.

11. The method of claim 10 wherein:
receiving orders from a customer comprises receiving orders from an internet application; and
said application includes store aisle information regarding the location of the purchased items.

12. The method of claim 11 wherein:
providing the customer's food order to the customer is done a drive through pickup window.

* * * * *